United States Patent [19]
Woolsey

[11] Patent Number: 6,048,642
[45] Date of Patent: Apr. 11, 2000

[54] ADAPTIVE CLAMPING OF AN ELECTROCHEMICAL CELL WITHIN A REPLACEABLE CONTAINER TRAY

[75] Inventor: Terrill L. Woolsey, Wichita, Kans.

[73] Assignee: LSI Logic Corporation, Milpitas, Calif.

[21] Appl. No.: 08/884,836

[22] Filed: Jun. 30, 1997

[51] Int. Cl.[7] .................................................. H01M 2/10
[52] U.S. Cl. ........................ 429/163; 429/100; 429/121
[58] Field of Search ................................ 361/683; 429/1, 429/97, 99, 123, 159, 96, 121, 156, 152, 153, 154, 162, 163, 683

[56] References Cited

U.S. PATENT DOCUMENTS

| | | | |
|---|---|---|---|
| 2,536,698 | 1/1951 | Ruben | 136/111 |
| 4,247,603 | 1/1981 | Leffingwell et al. | 429/1 |
| 4,431,717 | 2/1984 | Kikuchi | 429/100 |
| 4,554,221 | 11/1985 | Schmid | 429/1 |
| 4,666,278 | 5/1987 | Uematsu et al. | 354/288 |
| 5,224,870 | 7/1993 | Weaver et al. | 439/157 |
| 5,288,565 | 2/1994 | Gruenstern | 429/153 |
| 5,331,506 | 7/1994 | Nakajima | 361/683 |
| 5,368,956 | 11/1994 | Gruenstern et al. | 429/131 |
| 5,432,017 | 7/1995 | Hassemer et al. | 429/4 |
| 5,455,737 | 10/1995 | Ogami et al. | 361/680 |
| 5,534,366 | 7/1996 | Hwang et al. | 429/91 |
| 5,841,630 | 11/1998 | Seto et al. | 361/683 |

FOREIGN PATENT DOCUMENTS 4323455  1/1994  Germany ..................... H05K 5/02

*Primary Examiner*—Maria Nuzzolillo
*Assistant Examiner*—Monique M. Wills

[57] ABSTRACT

The invention provides an exemplary computer component which comprises a battery pack and a container tray for receiving the battery pack. The battery pack in turn comprises a base and a cover which are slidable relative to each other to accommodate for the thickness of the battery pack when received within the container tray. Further, the container tray includes an aperture to provide access to the battery pack. A module is also provided and includes an interfacing device to allow the battery pack to be coupled to the module when the container tray is inserted into the module.

9 Claims, 12 Drawing Sheets

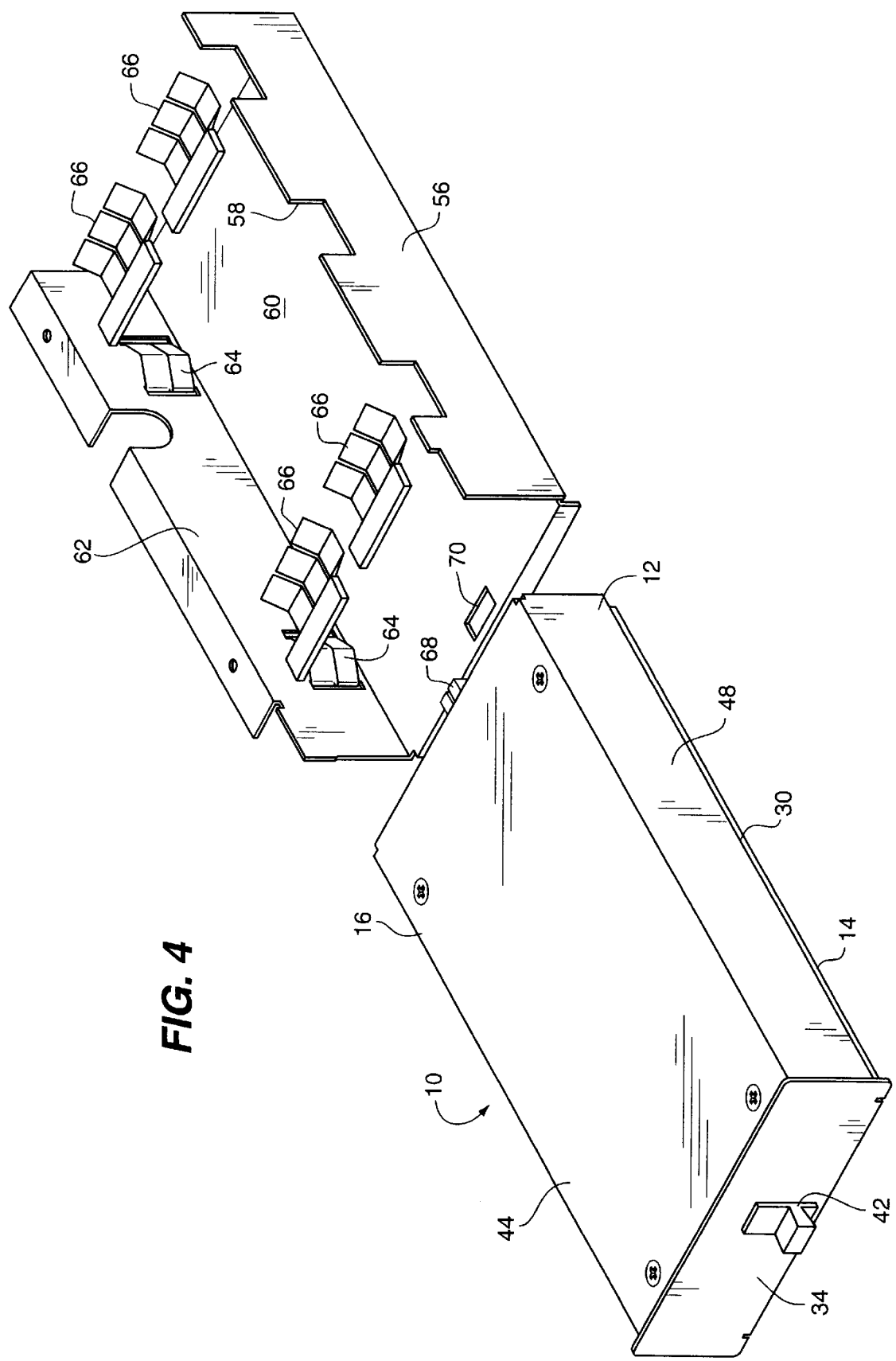

ADAPTIVE CLAMPING OF AN ELECTROCHEMICAL CELL WITHIN A REPLACEABLE CONTAINER TRAY

BACKGROUND OF THE INVENTION

The invention relates generally to the field of power supplies, and in particular to adjustable container trays for housing such power supplies. In one particular aspect, the invention provides a container tray which generally conforms in size and shape to a battery pack which in turn is employed to provide backup power to a module of a computer unit.

In many large computer systems, it is desirable to provide various electrical backup support systems in the event of power failure. In this way, important data stored within the computer system will not be lost during an unexpected power outage. In some cases, such electrical backup support is provided by a replaceable battery pack that may be inserted into and removed from a portion of the computer system. When using such battery packs, it is desirable to provide a protective cover to protect both the battery pack (e.g., in the event that the battery pack is dropped) and the computer system (e.g., from corrosive materials which may leak from the battery pack).

In the computer industry, there is a general trend to make computer systems smaller and more compact. In this way, more economical use of floor or other storage space may be made. Consequently, the various computer components and modules which are used within the system also need to be made smaller and more compact. For instance, an electrical backup support system may need to be minimized in size in order to efficiently fit within a module of a computer unit.

Hence, it would be desirable to provide a container tray arrangement and method for housing a battery pack which in turn may be inserted into a module of a computer unit to provide electrical backup support. Such a container tray should be minimally sized, and will preferably be adjustable so that it may generally conform to both the size and shape of the battery pack. Further, such a container tray should provide protection for the battery, e.g., from impact blows, as well as preventing harmful substances from leaking into the module. The container tray arrangement should also allow for the battery pack to be easily interfaced with the module upon its insertion. Still further, the container tray arrangement should be easy to use, thereby facilitating easy insertion into and removal from the module.

SUMMARY OF THE INVENTION

The invention provides exemplary container tray arrangements and methods which are adapted to electrically interface a battery pack with a module of a computer unit in order to provide electrical backup support for certain aspects of the computer unit. Although generally described in the context of battery packs, it will be appreciated that the container tray arrangements may be used in housing a variety of other devices or articles which are to be inserted into and interfaced with other components in a tightly arranged manner.

In one exemplary embodiment, the invention provides a container tray which comprises a base having at least one side and a cover having at least one side. The base and cover are configured such that the base may be slidably mated with the cover by sliding the sides relative to each other. In this way, when the base and the cover are mated, an enclosure is formed which is adapted to receive an article. Further, the height of the enclosure is adjustable by sliding the sides relative to each other. In this way, the height of the container tray may be adjusted to the height of the article. The container tray further includes an attachment mechanism to secure the base to the cover.

In one particular aspect, the base defines an interface aperture to provide access to the article when within the enclosure. In another aspect, a latching mechanism is operably attached to the base or the cover and is adapted to latch the container tray to a module. In still another aspect, the base and the cover each include a planar surface, with each planar surface being adapted to be placed adjacent to planar surfaces of the article. In this way, the base and the cover will closely conform to the size and shape of the article. In yet another aspect, a variety of attachment mechanisms may be used to secure the cover to the base, including screws, bolts, clamps, and the like.

In another exemplary embodiment, the invention provides a container tray system which comprises a base having a generally planar surface and at least one side. A cover is also provided having a generally planar surface and at least one side. Further, an attachment mechanism is provided to secure the base to the cover. The system further includes an article having a generally planar top end and a generally planar bottom end. The article is enclosed within the base and the cover, with the planar surfaces of the base and the cover being adjacent the top and bottom ends of the article. Further, the sides of the base and the cover slide relative to each other to accommodate for the height of the article.

Preferably, the article comprises a battery pack and the base and the cover define a container tray which includes an aperture to allow an interfacing device to be coupled with the battery pack. In this way, as the container tray is slid into a module of a computer unit, the interfacing device will be coupled with the battery pack.

In another aspect, the container tray includes a latching mechanism which is adapted to latch the container tray to a module of a computer unit. In this way, the container tray may be secured within the module upon insertion.

In still another embodiment, the invention provides a computer component which comprises a battery pack and a container tray. In turn, the container tray comprises a base and a cover to allow the battery pack to be removably received within the container tray. The base and the cover are slidable relative to each other to accommodate for the height of the battery pack when received within the container tray. Further, the container tray includes an aperture to provide access to the battery pack. The computer component further includes a module having an electrical interface. In this way, the interface may be coupled with the battery pack through the interface aperture when the container tray is inserted into the module.

In one preferable aspect, the interface comprises an electrical contact to allow electrical power to be supplied from the battery pack to a circuit board on the module. In this way, the circuit board having a cache memory may be provided with backup power to protect the data stored within the cache memory in the event of power failure. Typically, the module will be configured to be inserted into a larger computer unit having its own power supply and data storage devices.

In one exemplary aspect, the base and the cover each comprise a planar surface and at least one side. The battery pack further includes a planar top end and a planar bottom end so that the planar surfaces of the base and the cover will be placed adjacent to the planar ends of the battery pack when inserted therein. Preferably, an attachment mechanism is provided to secure the base to the cover to securely hold the battery pack within the container tray.

The invention further provides an exemplary method for supplying backup power to a portion of a computer unit. According to the method, a battery pack is inserted into a base having at least one side. A cover is then placed on the base, with the cover having at least one side positioned over the battery pack to enclose the battery. When the cover is placed over the base, the sides of the base and cover slide relative to each other to accommodate for the height of the battery pack. The enclosed battery pack is then inserted into a module of the computer unit.

Since the module will preferably have limited space, the base and the cover will preferably each include a planar surface which will be received against a planar top end and a planar bottom end of the battery pack. In another aspect, the base and the cover will preferably define a container tray which includes an aperture so that the battery pack may be electrically coupled to an interfacing device upon insertion of the container tray into the module. In this ways backup electrical power may be supplied to a circuit board in the module.

Conveniently, the container tray may be configured to be slid into the module. For removal, the container tray is simply slid from the module. If needed, a replacement battery pack may then be inserted back into the module. Optionally, a latching mechanism may be provided to latch the receiving container tray to the module upon insertion of the battery pack into the module.

BRIEF DESCRIPTION OF THE DRAWINGS

FIG. 4 is a perspective view of the container tray system of FIG. 1 being inserted into a retainer according to the invention.

DETAILED DESCRIPTION OF THE SPECIFIC EMBODIMENTS

The invention provides exemplary systems and methods for housing an article or device. The systems and methods are configured such that the article or device may be housed using minimal space. In this way, protection may be provided to the article or device while still facilitating its introduction into and removal from a larger system.

In a preferable aspect, the article or device will comprise a battery pack that is used to supply backup power to a circuit board having cache memory. In this way, backup power may be provided to the circuit board in the event of power failure so that the data stored within the cache memory will not be lost.

Although useful with a wide variety of battery packs, the invention will find its greatest use with battery packs which have planar surfaces. In this way, a container tray may be provided with planar surfaces which will be placed adjacent the planar surfaces of the battery pack when the battery pack is housed within the container tray. In this way, the resulting system will have overall dimensions which correspond substantially to the size and shape of the battery pack.

The container tray will preferably be constructed of materials which are strong and rigid enough to protect the battery pack from external impact blows. Further, the container tray will be constructed so that it will safely contain any hazardous materials which may inadvertently leak from the battery pack. Exemplary materials which may be used to construct the container tray comprise metals, structural and/or impact plastics, and the like.

Figure 1:
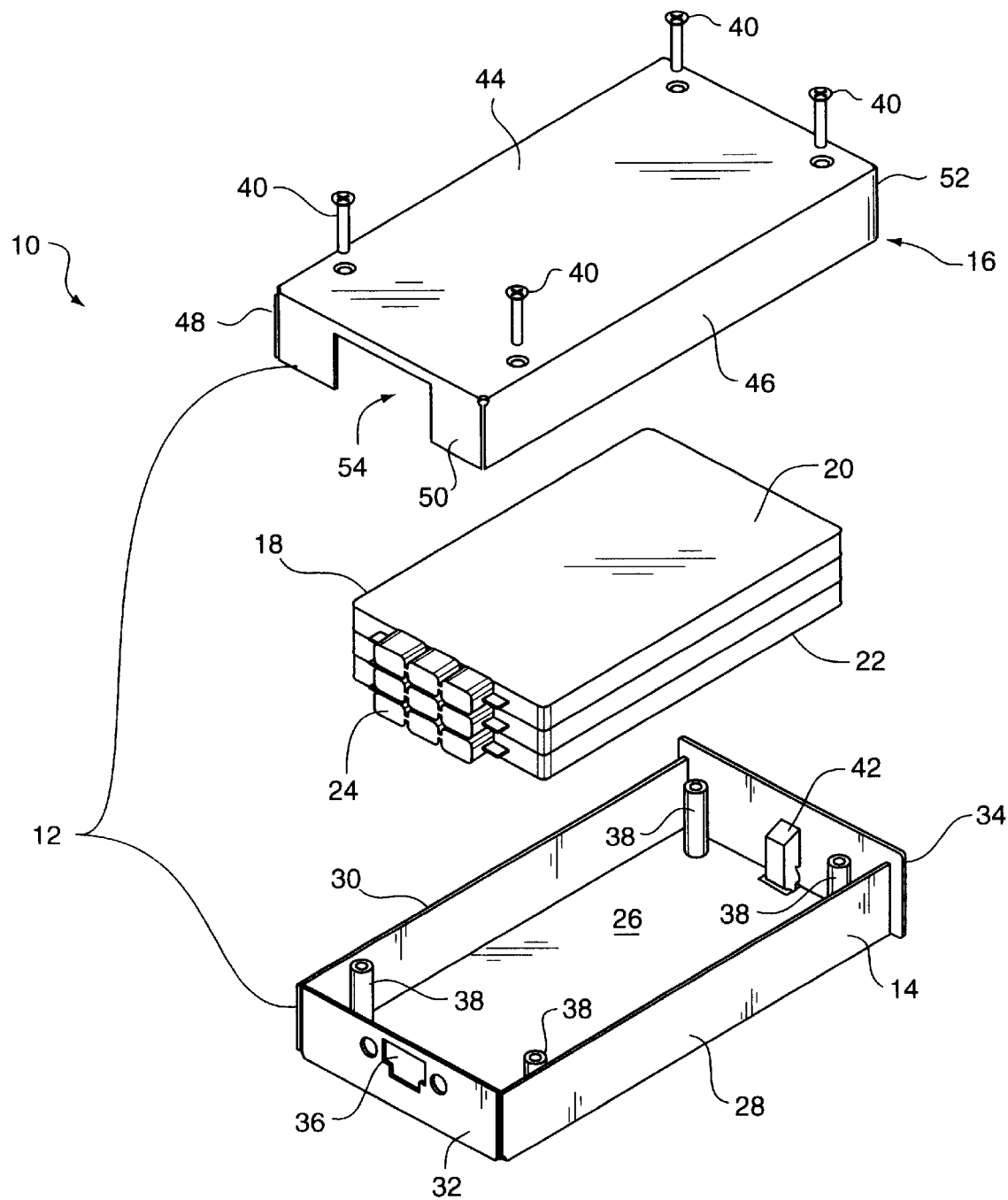
FIG. 1 is an exploded perspective view of an exemplary container tray system according to the invention.

Referring now to FIG. 1, an exemplary embodiment of a container tray system 10 will be described. System 10 comprises a container tray 12 which is constructed of a base 14 and a cover 16. System 10 further includes a battery pack 18 which is received within container tray 12 as described in greater detail hereinafter.

Battery pack 18 includes a top planar surface 20 and a bottom planar surface 22. Battery pack 18 further includes an electrical interface 24 across which electrical power may be transferred. An exemplary battery pack which may be used with the present invention comprises a lead-acid cell battery pack, such as those commercially available from Portable Energy Products.

Base 14 comprises a planar bottom 26, sides 28 and 30, a back 32 and a front 34. Back 32 includes an aperture 36 through which an interfacing device may be received to couple the interfacing device with electrical interface 24 of battery pack 18. Base 14 further includes threaded columns 38 for receiving clamping screws 40 in order to securely affix cover 16 to base 14. Base 14 also includes a latching mechanism 42 which is employed to latch container tray 12 with a module as described in greater detail hereinafter.

Cover 16 comprises a planar top 44, sides 46 and 48, a back 50, and a front 52. Back 50 includes a recess 54 which allows aperture 36 to remain uncovered when cover 16 is affixed to base 14.

Figure 3:
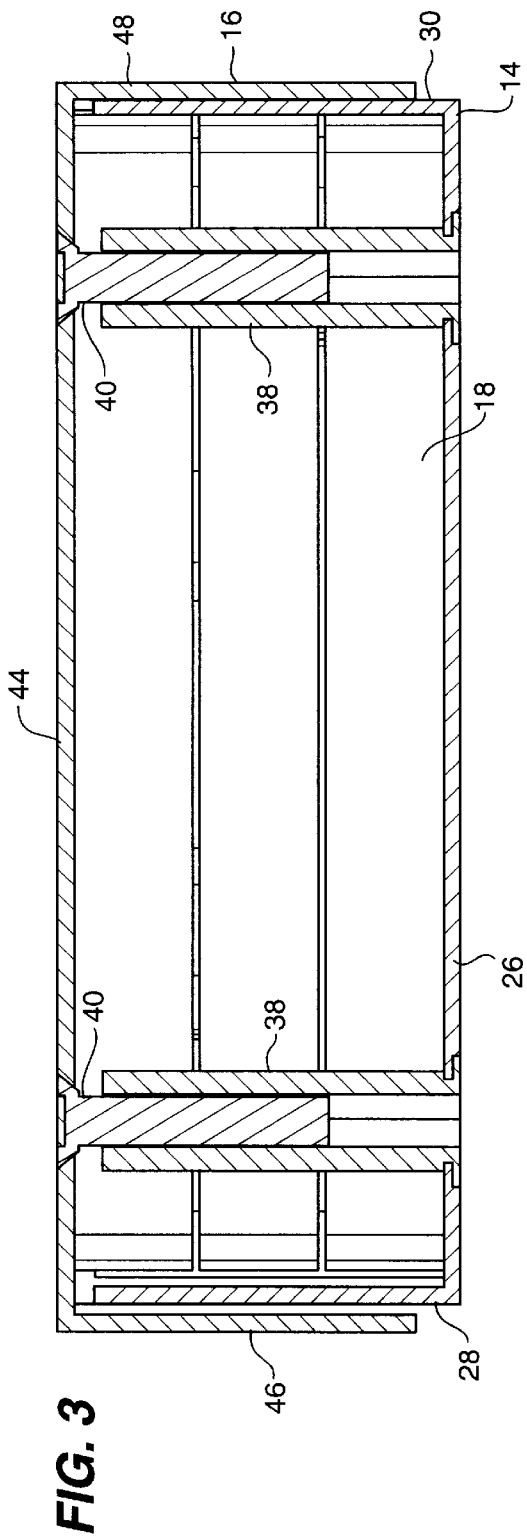
FIG. 3 illustrates the container tray system of FIG. 2 with the cover being securely attached to the base.
Figure 2:
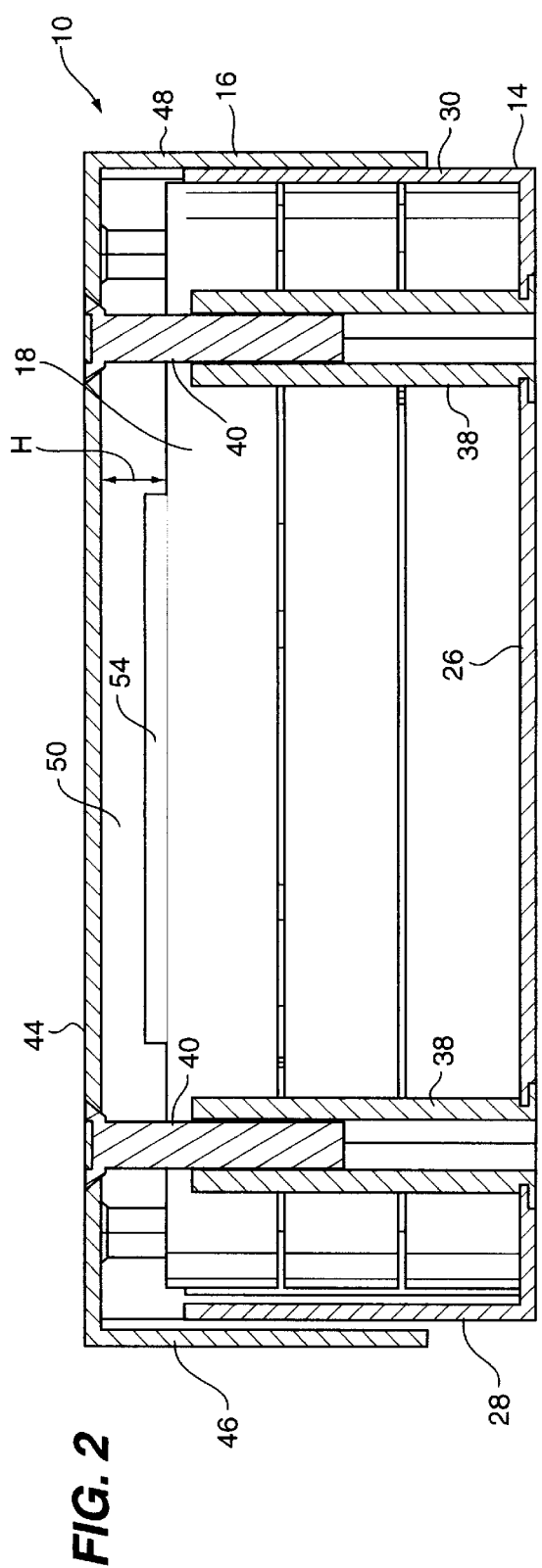
FIG. 2 is a cross-sectional side view of the container tray system of FIG. 1 showing a cover being inserted over a base.

As illustrated in FIG. 2, system 10 is assembled by placing battery pack 18 into base 14 and then sliding cover 16 over base 14. Sides 46 and 48 of cover 16 slide along sides 28 and 30 of base 14 until planar top 44 rests on battery pack 18 as illustrated in FIG. 3. The four threaded columns 38 laterally secure battery pack 18 within base 14. Clamping screws 40 are rotated to securely affix cover 16 to base 14.

Since battery pack 18 includes top and bottom planar surfaces, planar top 44 and planar bottom 26 of container tray 12 will be substantially flush against battery pack 18 so that the height of tray system 10 will be the height of battery pack 18 and the thickness of top 44 and bottom 26. Further, as illustrated in FIG. 2, a height H of container tray 12 may be varied to accommodate for different-sized battery packs.

In this way, container tray 12 will be able to conform in shape and size to a variety of different battery packs.

Figure 5:
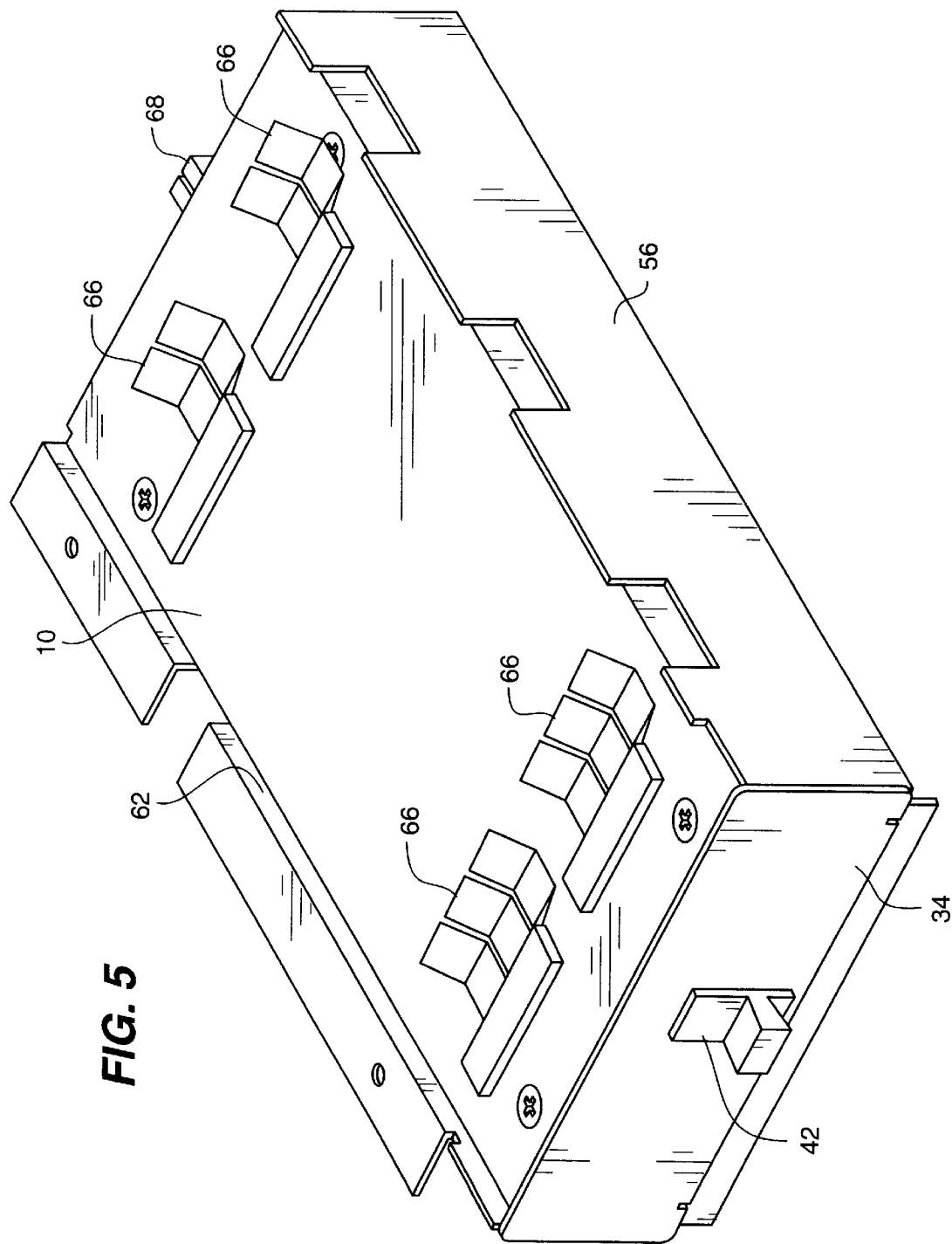
FIG. 5 illustrates the container tray system and the retainer of FIG. 4 when coupled together.

Another advantage of providing container tray 12 with planar top 44 and planar bottom 26 is that smooth external surfaces are provided to allow container tray 12 to easily slide within a module like a tray. Such a feature is illustrated in FIGS. 4 and 5. In FIG. 4, system 10 is being inserted into a retainer 56 having a pair of alignment surfaces 58 and 60. Container 56 further includes a side 62 having guide springs 64. A bottom surface (not shown for convenience of illustration) includes a plurality of guide springs 66. With this configuration, system 10 is inserted into retainer 56, with guide springs 64 and 66 forcing container tray 12 against surfaces 58 and 60. In this way, surfaces 58 and 60 align container tray system 10 within retainer 56. In this manner, an interfacing device 68 which is interfaced with the battery pack in system 10 will be generally aligned with an interface on a circuit board of a module as described in greater detail hereinafter.

As best shown in FIGS. 1 and 4, latching mechanism 42 comprises a slide latch which may be slid in an up and down motion. In this way, as system 10 is fully received into retainer 56, latch mechanism 42 may be moved downward to insert the slide latch into an aperture 70 (see FIG. 4) of retainer 56. In this way, system 10 will be secured within retainer 56. To remove system 10 from retainer 56, latching mechanism 42 is simply lifted to move the latch slide out of aperture 70. System 10 may then be pulled from retainer 56.

Figure 6:
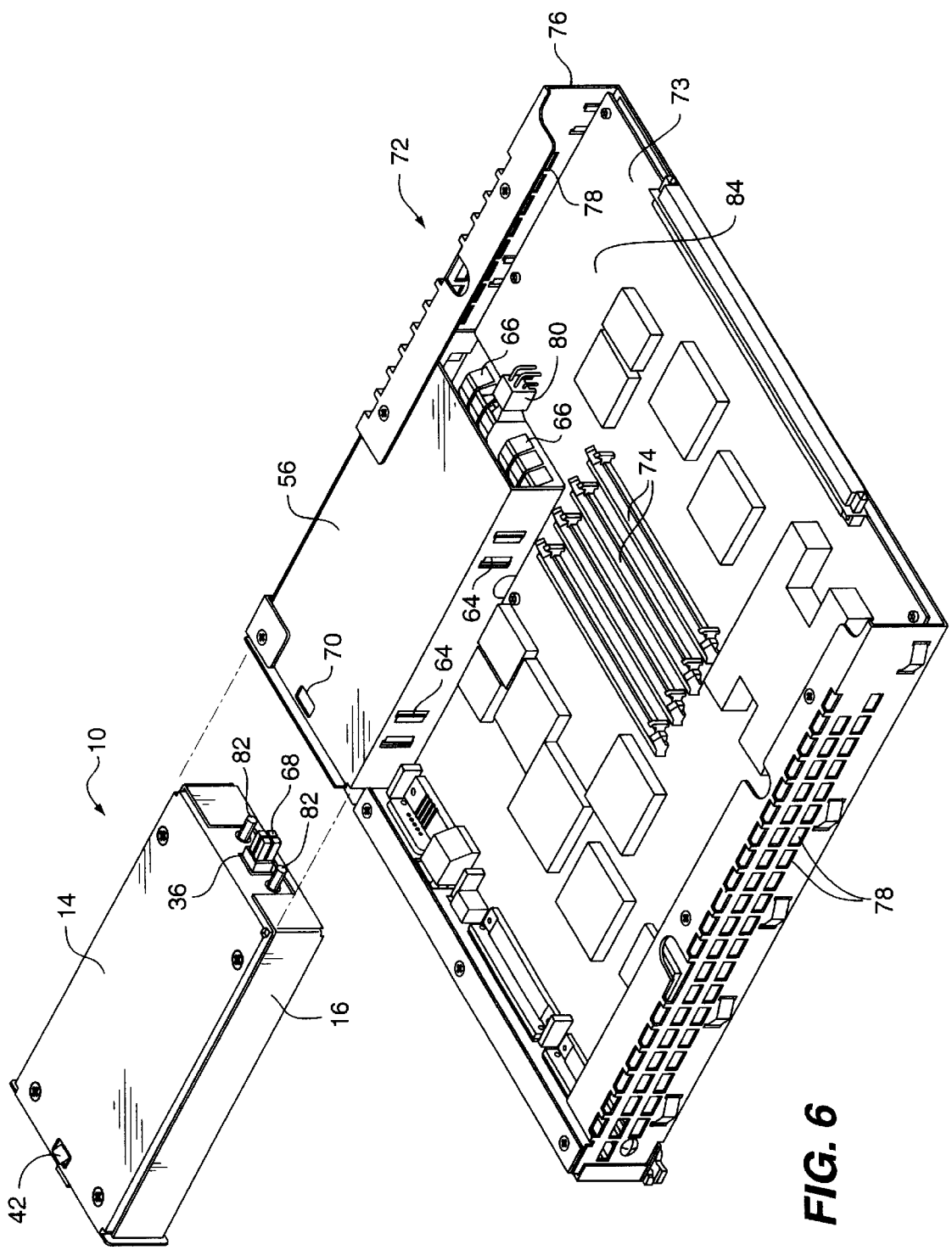
FIG. 6 is a bottom perspective view of the container tray system of FIG. 1 and a module having the retainer of FIG. 4 and a circuit board according to the invention.
Figure 8:
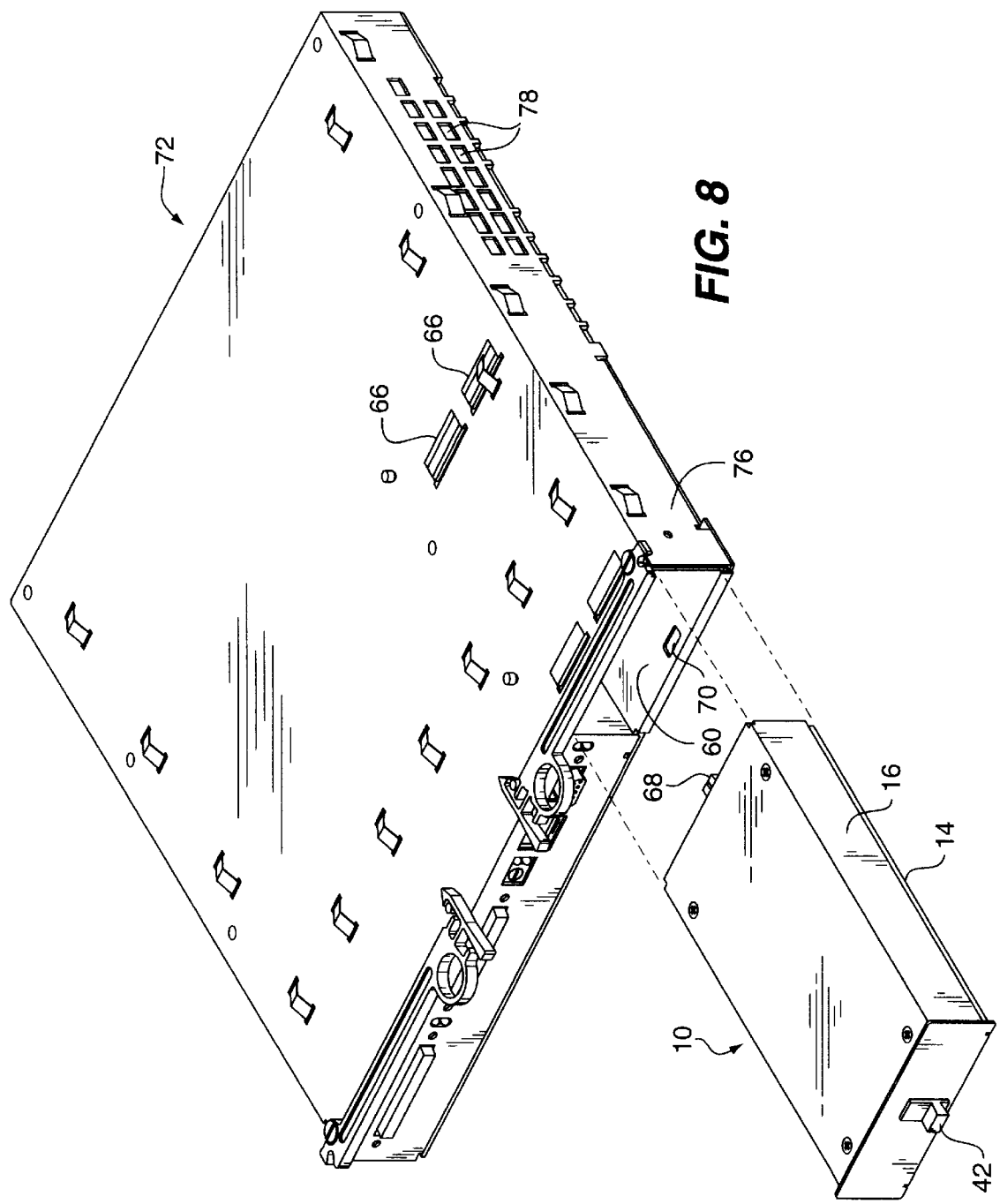
FIG. 8 is a top perspective view of the container tray system and module of FIG. 6.

As illustrated in FIGS. 6 and 8, retainer 56 is included as part of a module 72. Module 72 further includes a circuit board 73 having a plurality of cache memory modules 74 for temporarily storing data of a larger computer system as described in greater detail hereinafter. Circuit board 73 is secured to an outer tray 76. Retainer 56 is also affixed to outer tray 76. Disposed within outer tray 76 are a plurality of apertures 78 through which air may flow to provide a thermal cooling flow path for retainer 56 and container tray system 10.

Figure 7:
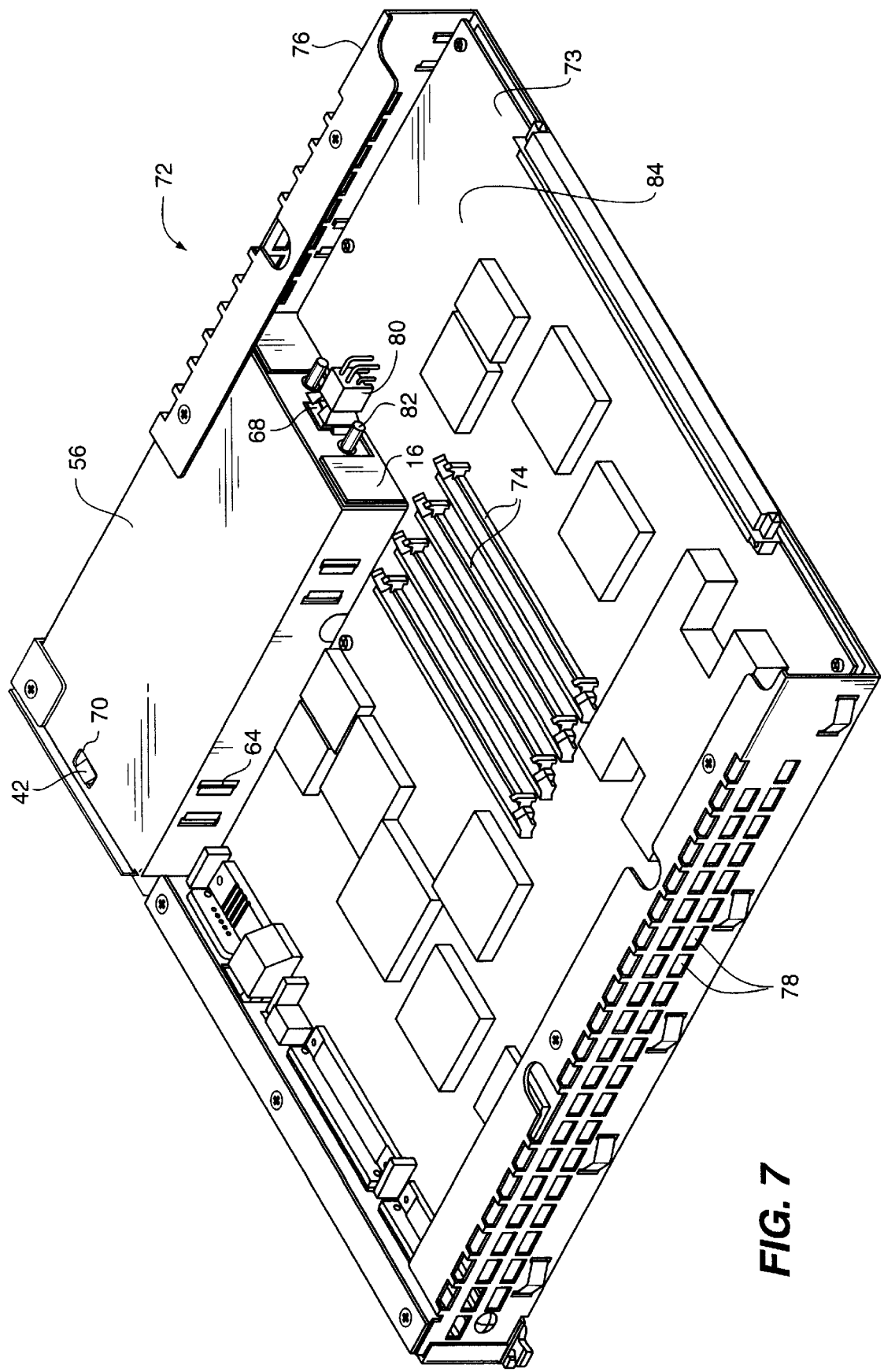
FIG. 7 illustrates the container tray system of FIG. 6 when received into the retainer of the module.
Figure 9:
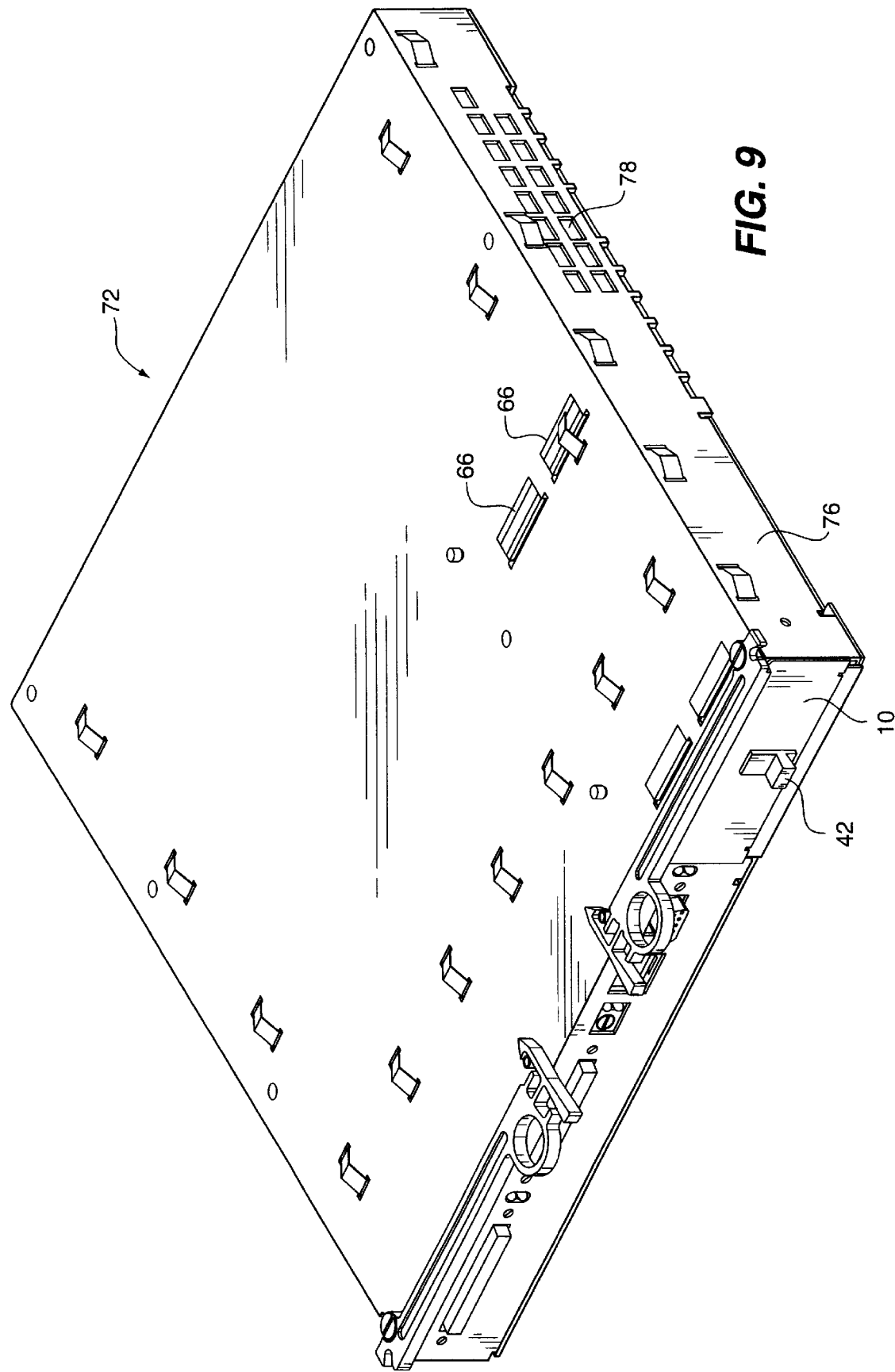
FIG. 9 is a top perspective view of the combined container tray system and module of FIG. 7.

Referring now to FIGS. 7 and 9, insertion of system 10 into retainer 56 will be described. Circuit board 73 includes an interface 80 which receives interface device 68 when system 10 is inserted into retainer 56. Interface device 68 will preferably comprise a blind mate connector, such as those commercially available from Molex. As best shown in FIG. 6, aperture 36 is larger than interfacing device 68 so that interfacing device 68 may be provided with sufficient "float" so that it may align with interface 80 (which will typically be rigidly mounted to circuit board 73). Further, a pair of pins 82 are provided to control the amount of "float" when aligning interfacing device 68 with interface 80.

Circuit board 73 includes a charging circuit area 84 which controls the charging and testing of the battery pack within system 10 so that the battery pack will remain at its maximum potential. In this way, the battery pack will always remain recharged so that it may be useful in the event of a power failure. Once the battery pack is interfaced with circuit board 73, the circuit board may draw on the battery pack for reserve power if needed. In this way, power may be supplied at all times to circuit board 73 so that data stored within cache memory modules 74 may be maintained at all times.

Figure 10:
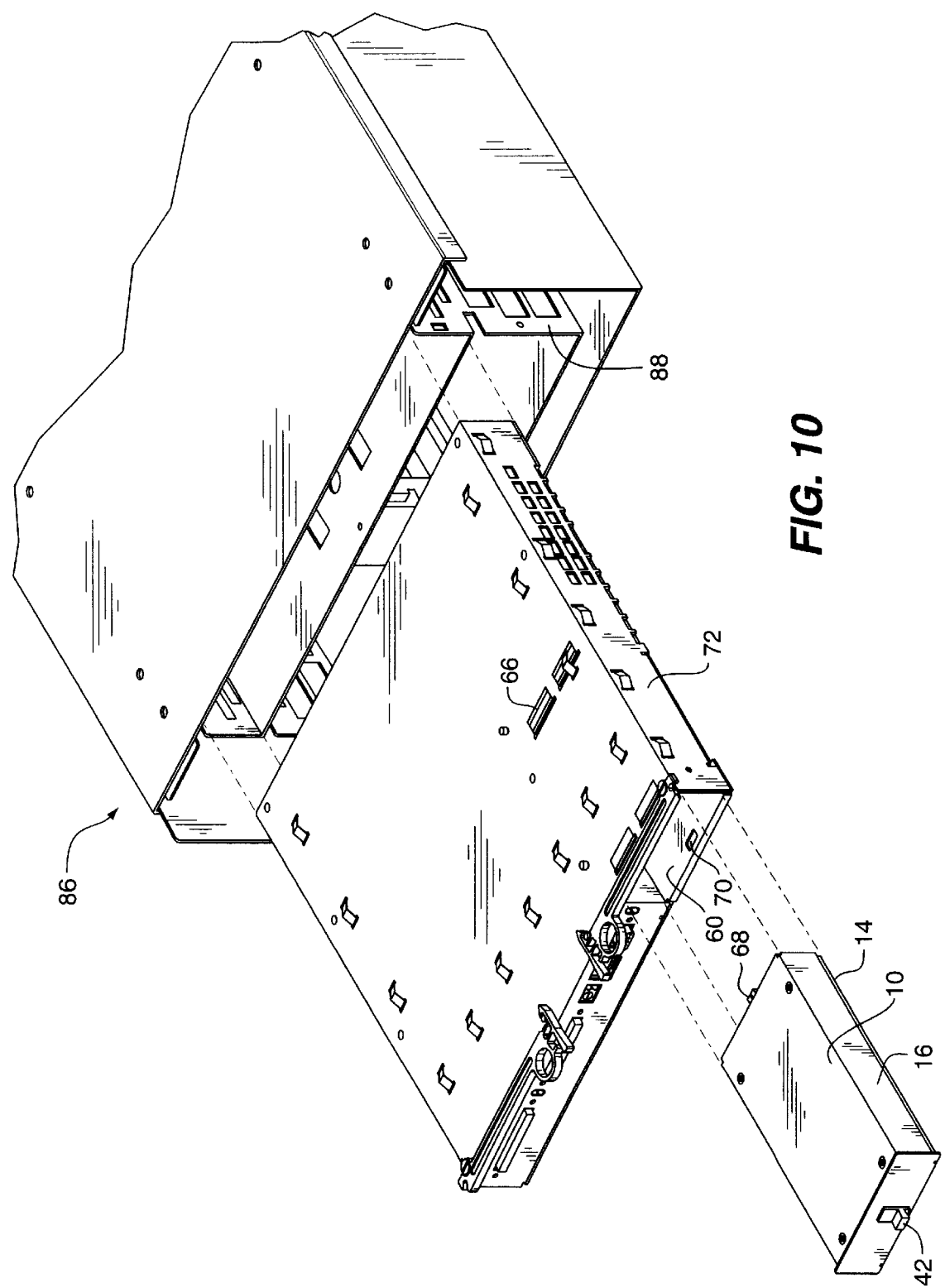
FIG. 10 is an exploded perspective view of the container tray system and module of FIG. 8 and a computer unit for receiving the module according to the invention.
Figure 11:
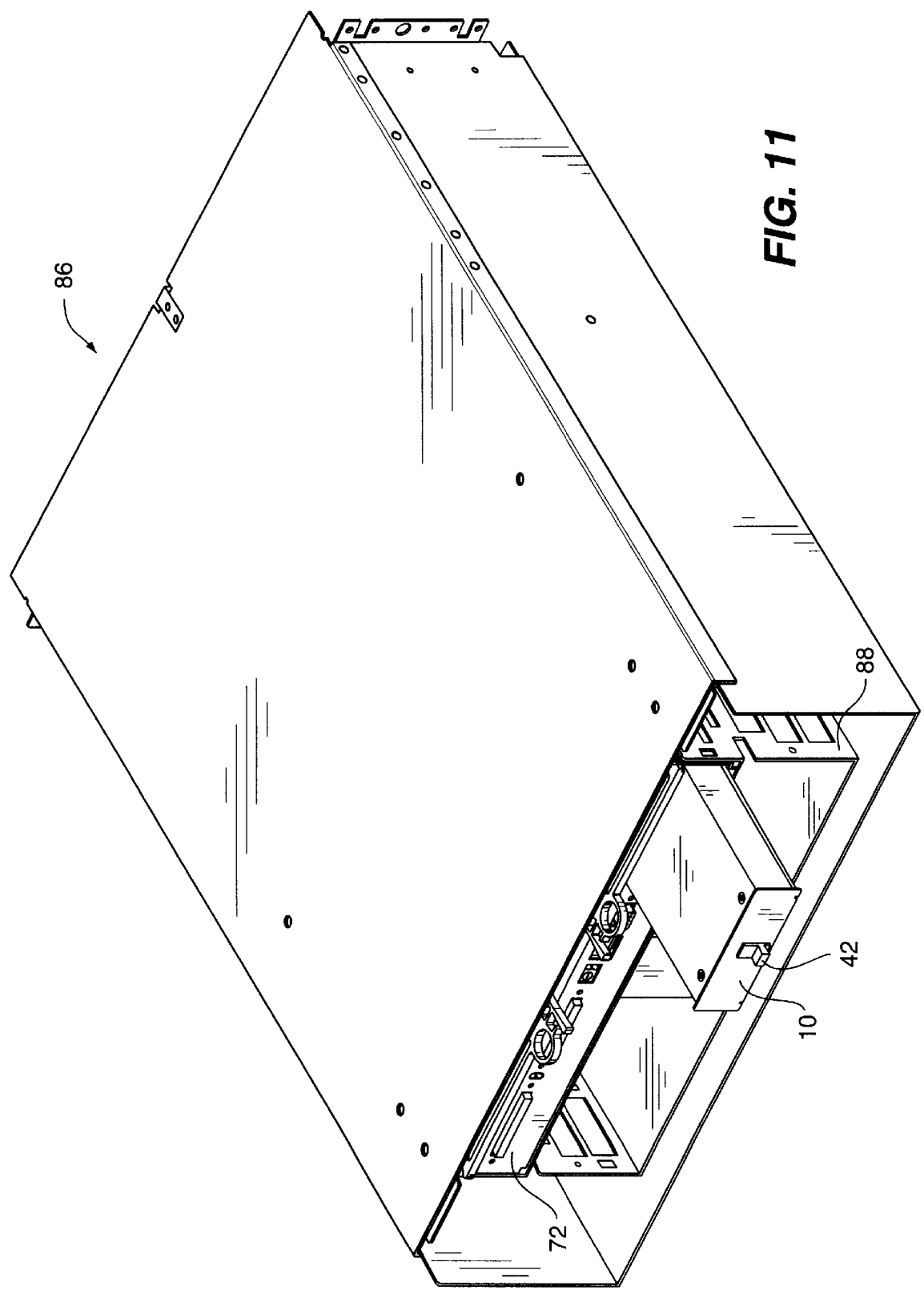
FIG. 11 illustrates the module of FIG. 10 when received into the computer unit.

Referring now to FIGS. 10 and 11, insertion of module 72 into a computer unit 86 will be described. Computer unit 86 includes a rack 88 into which module 72 may be inserted. Computer unit 86 will preferably be a component of a larger computer subsystem, i.e. multiple computer units will preferably be interconnected to form a computer subsystem. Computer unit 86 may include a variety of electronic elements and devices which will cooperate with other units within the subsystem. For example, computer unit 86 may include a plurality of disk drives, with module 72 including a controller having a processor for distributing data to the various disk drives. With such an arrangement, one function of module 72 will be to serve as a backup system to back up the cache memory data.

When module 72 is within rack 88, system 10 remains accessible so that it may easily be removed and replaced if necessary. In this way, it may be insured that backup power may always be supplied to module 72 to allow data stored and processed within computer unit 86 to be more readily be protected.

Figure 12:
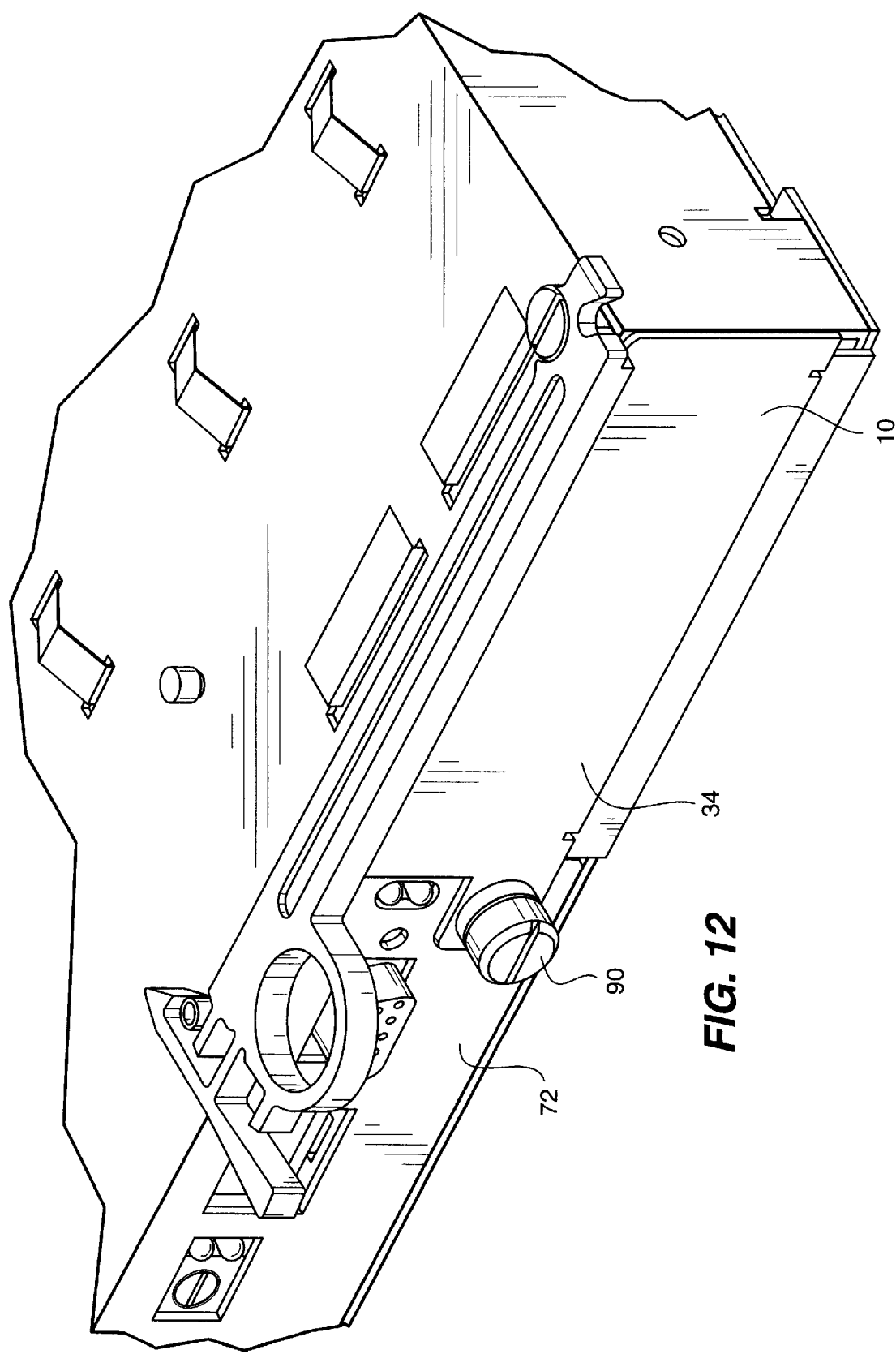
FIG. 12 is a front perspective view of a container tray system having an alternative latching mechanism according to the invention.
Figure 13:
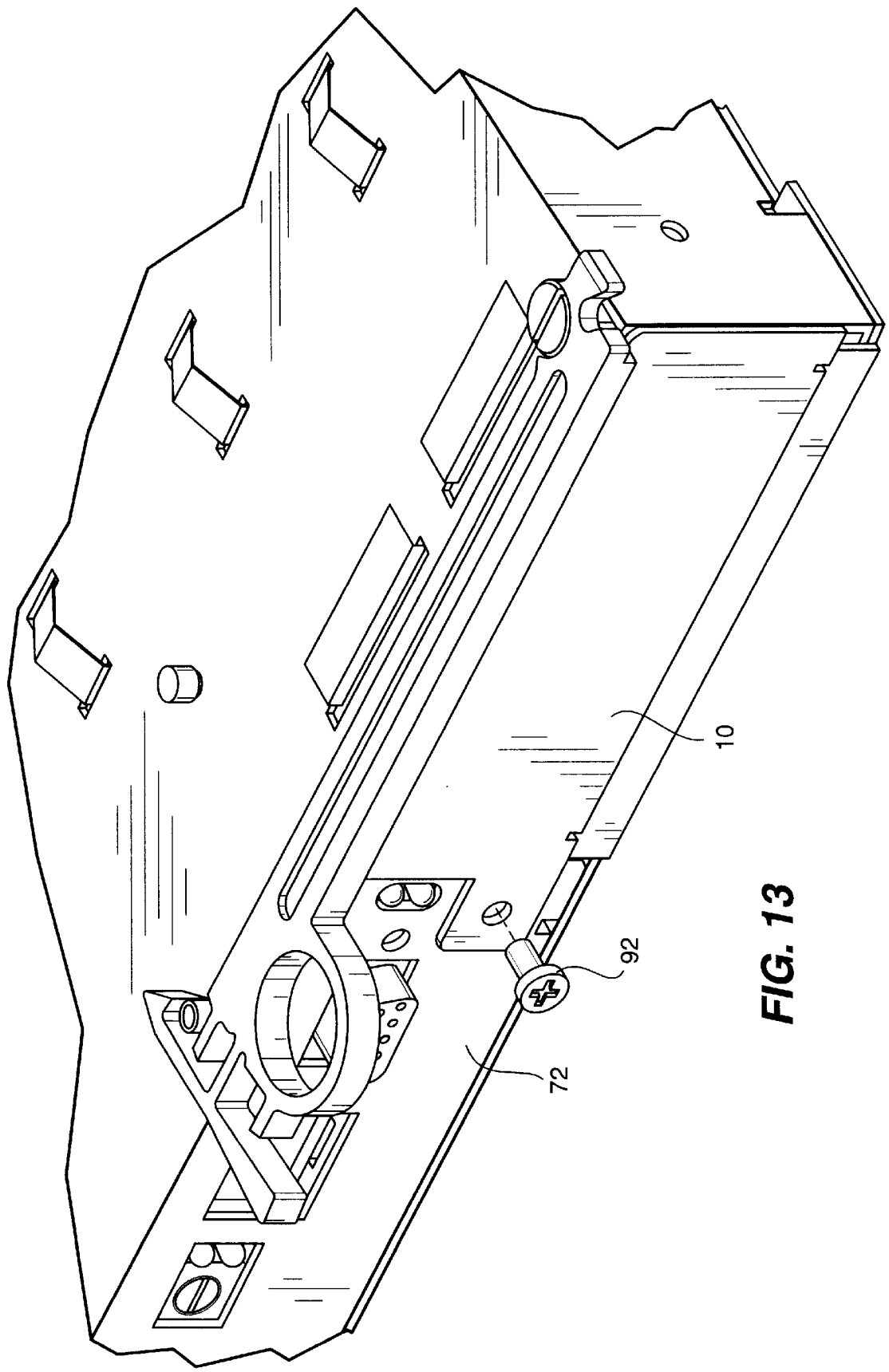
FIG. 13 is a front perspective view of a container tray system having yet another alternative latching mechanism according to the invention.

Referring now to FIG. 12, an alternative latching mechanism 90 for use with retainer tray system 10 will be described. Latching mechanism 90 comprises a thumbscrew which may be employed to secure system 10 to module 72. In particular, the thumbscrew is rotated to affix front 34 of system 10 to module 72. To release latching mechanism 90, the thumbscrew is simply rotated in an opposite direction to allow system 10 to be pulled from module 72. As another alternative, thumbscrew 90 may be replaced by a screw 92 as illustrated in FIG. 13. In this way, a screwdriver, allen wrench or the like may be employed to secure system 10 to module 72.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A container tray comprising:

a base having at least one side;

a cover having at least one side, wherein the base may be slidably mated with the cover by sliding the sides relative to each other, wherein the base and the cover when mated form an enclosure which is adapted to receive a battery pack, and wherein a height of the enclosure is adjustable by sliding the sides relative to each other; and an attachment mechanism to secure the base to the cover.

2. A container tray as in claim 1, wherein the base defines an interface aperture to provide access to the battery pack.

3. A container tray as in claim 1, further comprising a latching mechanism operably attached to the base or the cover, wherein the latching mechanism is adapted to latch the container tray to a module.

4. A container tray as in claim 1, wherein the base and the cover each further include a planar surface, and wherein the planar surfaces of the base and the cover are adapted to be placed adjacent to planar surfaces of the battery pack.

5. A container tray as in claim 1, wherein the attachment mechanism comprises at least one screw.

6. A container tray system, comprising:

a base having a generally planar surface and at least one side;

a cover having a generally planar surface and at least one side;

an attachment mechanism to secure the base to the cover; and a battery pack having a generally planar top end, a generally planar bottom end and a thickness;

wherein the battery pack is enclosed within the base and the cover, with the planar surfaces of the base and the cover being adjacent the top and bottom ends, and with the sides of the base and the cover sliding relative to each other to accommodate for the thickness of the battery pack.

7. A system as in claim 6, wherein the base and the cover define a container tray, and wherein the container tray includes an aperture to allow an interfacing device to be coupled with the battery pack.

8. A system as in claim 6, wherein the container tray further includes a latching mechanism which is adapted to latch the container tray to a module.

9. A system as in claim 6, wherein the attachment mechanism comprises at least one screw.

* * * * *